S. HOBBS.
Gate.

No. 217,106.  Patented July 1, 1879.

Witnesses:
J. W. Garner
W. S. D. Haines

Inventor:
Saml. Hobbs,
per
F. A. Lehmann,
Atty.

UNITED STATES PATENT OFFICE.

SAMUEL HOBBS, OF WILMOT, OHIO, ASSIGNOR TO JNO. MEESE, JR., AND WM. M. JOHNSTON, OF SAME PLACE, ONE-THIRD TO EACH.

IMPROVEMENT IN GATES.

Specification forming part of Letters Patent No. 217,106, dated July 1, 1879; application filed February 1, 1879.

*To all whom it may concern:*

Be it known that I, SAMUEL HOBBS, of Wilmot, in the county of Stark and State of Ohio, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in the combination of a diagonal wooden brace which extends up both sides of the gate and an iron brace which runs directly from and forms the upper hinge, and which has its outer end fastened to the upper end of the wooden brace, whereby the gate is prevented from sagging, as will be more fully described hereinafter.

The accompanying drawings represent my invention.

Figure 1:
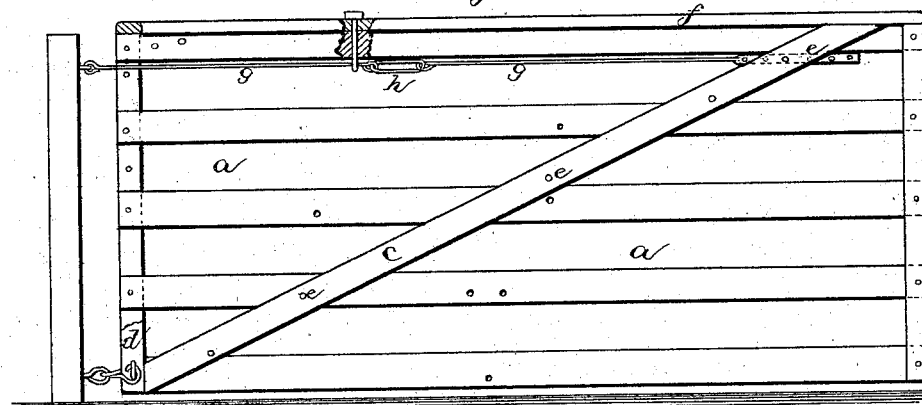
Figure 2:
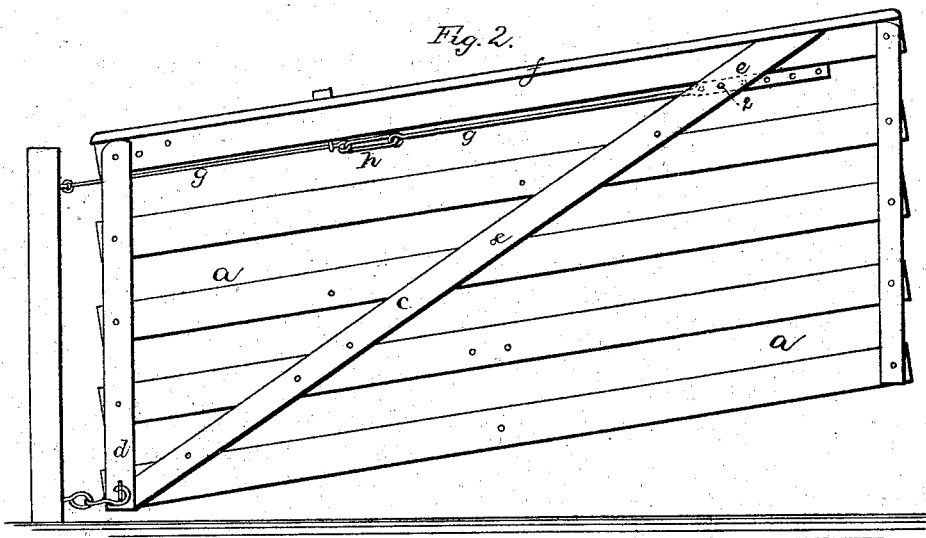

Figure 1 is a side elevation of my gate in its natural position. Fig. 2 is a similar view, showing the gate raised at one end.

$a$ represents an ordinary swinging gate, in which all of the parts are pivoted together, so that the gate can be raised upward at its free end. Passing diagonally up the gate on each side is a wooden brace, $c$, which braces are connected rigidly together between the bars of the gate by the pins $e$. The lower ends of these braces bear against the uprights $d$ of the gate, while their upper ends bear against the under side of the top flange, $f$, and thus serve to brace the gate against sagging.

Instead of there being an upper hinge to the gate, there is a long iron brace, $g$, made in two parts and connected together by a link, $h$, and which brace has its outer end fastened near the upper end of the wooden brace $c$. As this iron brace $g$ is not fastened to the gate; but supports the whole upper part thereof by being fastened to the wooden braces $c$, it is evident that the heavier the gate the more strongly the upper ends of the braces $c$ bear up against the top of the gate and resist any inclination to sag.

By making the brace $g$ in two parts and connecting them together by means of a link, the brace is shortened as the outer end of the gate is raised upward without removing the pin 2, that passes through the braces $c$ and through one of the perforations in the end of the brace.

This is a great convenience in opening the gate when there is snow on the ground or an obstruction in the way, for it allows the outer end of the gate to be raised freely upward and then dropped down again at any time.

When it is desired to keep the end of the gate raised up for any length of time, so as to let small animals pass back and forth under it, the pin 2 is passed through the braces $c$ and one of the holes in the outer end of the brace $g$, as shown in Fig. 2, whereby the gate may be held at any desired angle.

The holes through the outer end of the brace $g$ also serve to take up any sagging of the gate, and to give any inclination that may be preferred to its outer end.

The lower hinge of the gate consists of a bent rod, which is fastened to the bolt that fastens the lower end of the gate together.

The side braces, $c$, serve to strengthen and brace the gate, and by catching under the top flange of the gate prevent a natural tendency of the gate to sag. This brace, however, not being rigidly attached to the fence, would serve but little use to the gate were it not for the iron brace $g$, which is fastened to it, and which resists the thrust of the gate.

The whole weight of the outer end of the gate coming on this brace, the wooden braces are drawn inward at their upper ends, and, while their lower ends bear against the upright $d$, their upper ends catch under the flange on top of the gate, which is thus held evenly balanced.

Having thus described my invention, I claim—

1. In combination with the gate $a$, the diagonal braces $c$ and iron brace $g$, the iron brace forming the upper hinge of the gate, and having its outer end fastened to the braces $c$ near their upper ends, substantially as shown.

2. In a gate, the combination of the diagonal wooden braces $c$ with the iron brace $g$, that forms the upper hinge of the gate, the brace $g$ being made in two parts and united by a link, $h$, substantially as set forth.

In testimony that I claim the foregoing I have hereunto set my hand this 28th day of December, 1878.

SAMUEL HOBBS.

Witnesses:
ARALDO W. JOHNSTON,
WM. M. JOHNSTON.